United States Patent
Aoki

(10) Patent No.: US 7,855,990 B2
(45) Date of Patent: Dec. 21, 2010

(54) RADIO COMMUNICATION SYSTEM AND METHOD ENABLING TRANSMISSION OF PACKETS TO RADIO TERMINAL IN PARALLEL VIA FIRST AND SECOND RADIO BASE STATIONS AMONG RADIO STATIONS, AND RADIO TERMINAL

(75) Inventor: Nobuhisa Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1351 days.

(21) Appl. No.: 11/084,602

(22) Filed: Mar. 18, 2005

(65) Prior Publication Data

US 2005/0163090 A1 Jul. 28, 2005

Related U.S. Application Data

(63) Continuation of application No. PCT/JP02/13547, filed on Dec. 25, 2002.

(51) Int. Cl.
H04W 4/00 (2009.01)
(52) U.S. Cl. .................... 370/331; 370/338; 370/395.21
(58) Field of Classification Search ................. 370/331, 370/338
See application file for complete search history.

(56) References Cited

U.S. PATENT DOCUMENTS

| | | | |
|---|---|---|---|
| 6,178,165 B1* | 1/2001 | Sakamoto et al. | 370/331 |
| 6,252,862 B1* | 6/2001 | Sauer et al. | 370/331 |
| 6,674,736 B1* | 1/2004 | Tiedemann, Jr. | 370/332 |
| 6,831,904 B1* | 12/2004 | Yamao et al. | 370/331 |
| 7,068,635 B2 | 6/2006 | Dempo | |
| 7,623,499 B2 | 11/2009 | Yahagi | |
| 2001/0018346 A1 | 8/2001 | Okajima et al. | |
| 2002/0054584 A1 | 5/2002 | Dempo | |
| 2002/0191561 A1 | 12/2002 | Chen et al. | |
| 2004/0192307 A1* | 9/2004 | Watanabe et al. | 455/436 |
| 2005/0163090 A1* | 7/2005 | Aoki | 370/338 |

FOREIGN PATENT DOCUMENTS

CN 1285697 2/2001

(Continued)

OTHER PUBLICATIONS

C.Perkins,"IP Mobility Support"(RFC 2002), Oct. 1996, pp. 7-10.*

(Continued)

*Primary Examiner*—Chirag G Shah
*Assistant Examiner*—Salvador E Rivas
(74) *Attorney, Agent, or Firm*—Katten Muchin Rosenman LLP

(57) ABSTRACT

A radio communication system includes multiple communications nodes which may become diversity branches, a relaying apparatus for relaying a communications signal, and a radio terminal which is able to use an IP address associated with a home address to move between wireless zones which the communications nodes form. The relaying apparatus includes a transmitting unit that transmits a received communications signal destined for the IP address, based on an instruction signal generated in response to a request of the radio terminal for site diversity, to at least two communications nodes including a communications node indicated in the instruction signal. The at least two communications nodes include a transmitting unit that transmits the communications signal to the radio terminal, and the radio terminal includes a receiving unit that receives the communications signal from each communications node.

3 Claims, 11 Drawing Sheets

FOREIGN PATENT DOCUMENTS

| | | |
|---|---|---|
| CN | 1353526 | 6/2002 |
| EP | 1 073 297 | 1/2001 |
| JP | 9-508773 | 11/1995 |
| JP | 2000-332825 | 11/2000 |
| JP | 2001-045534 | 2/2001 |
| JP | 2001-54126 | 2/2001 |
| JP | 2001-54162 | 2/2001 |
| JP | 2001-189954 | 7/2001 |
| JP | 2002-152277 | 5/2002 |
| JP | 2002-232436 | 8/2002 |
| JP | 2002-271842 | 9/2002 |
| JP | 2003-037626 | 2/2003 |
| WO | WO 95/32594 | 11/1995 |
| WO | 00/54475 | 9/2000 |
| WO | 02/35738 | 5/2002 |
| WO | 02/065731 | 8/2002 |

OTHER PUBLICATIONS

Farinacci et al., "Generic Routing Encapsulation (GRE)" (RFC 2784), Mar. 2000, p. 1-5.*
Japanese Office Action dated Oct. 30, 2007, from the corresponding Japanese Application.
Chinese Office Action Dated Apr. 25, 2008, from the corresponding Chinese Application.
Supplementary European Search Report dated Feb. 25, 2008, from corresponding European Application.
Appeal Decision dated Sep. 14, 2010, from the corresponding Japanese Application.

* cited by examiner

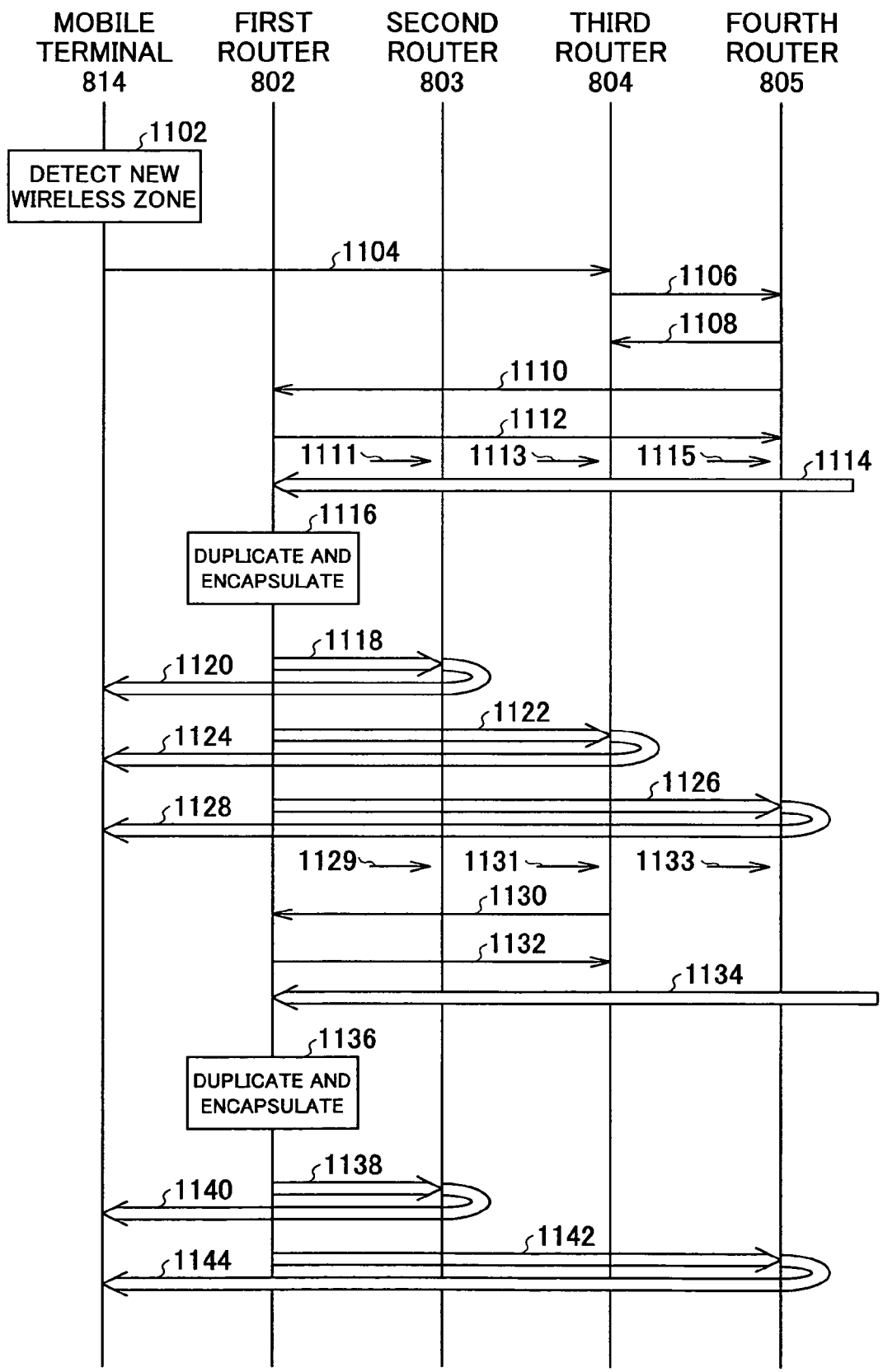

RADIO COMMUNICATION SYSTEM AND METHOD ENABLING TRANSMISSION OF PACKETS TO RADIO TERMINAL IN PARALLEL VIA FIRST AND SECOND RADIO BASE STATIONS AMONG RADIO STATIONS, AND RADIO TERMINAL

CROSS-REFERENCE TO RELATED APPLICATION

This application is a U.S. continuation application filed under 35 USC 111(a) claiming benefit under 35 USC 120 and 365(c) of PCT application JP02/13547, filed Dec. 25, 2002, which is hereby incorporated by reference.

BACKGROUND OF THE INVENTION

1. Field of the Invention

The present invention generally relates to a technology for Mobile IP (Internet Protocol)-compliant mobile communications, and particularly relates to a wireless communications system, and a relaying apparatus and a mobile terminal that are for use therein.

2. Description of the Related Art

With the proliferation of networking technologies, research and development activities regarding Internet protocols and architectures are in progress. More specifically, for an Internet protocol (the so-called Mobile IP) for assisting a communications terminal in moving, studies by such organizations as the IETF (Internet Engineering Task Force) are being carried out toward standardization.

FIG. 1 is one example of a wireless-communications system which is compliant with such Mobile IP as described above. A wireless communications system 100 has a first router 102, a second router 104, a third router 106 and a home agent 108 that route a communications signal to one another via a network 101 such as the Internet. Moreover, the wireless-communications system 100 has multiple wireless base-stations, the wireless base-stations respectively forming multiple wireless zones which collectively make up a wide wireless service area. In a wireless zone 112 of a wireless base-station 110 connected to the home agent 108, a home link for a mobile terminal 114 is formed. This mobile terminal 114 has a specific IP address (a home address) which does not change when moving between the wireless zones. The corresponding relationship between the home address and a care-of address to be described below is managed at the home agent 108.

A first wireless base-station 116 connected to the first router 102 wirelessly communicates with a mobile terminal 114 within a wireless zone 118. A second wireless base-station 120 connected to the second router 104 wirelessly communicates with the mobile terminal 114 within a wireless zone 122. It is assumed that the third router 106 is connected to a correspondent node 124 in communications with the mobile terminal 114.

Next, an overview of transmitting and receiving a communications signal in this wireless-communications system is provided. It is assumed that the mobile terminal 114 having a home address HA that is located within the wireless zone 118 of a first wireless base-station 116 communicates with the correspondent node 124. The mobile terminal 114 obtains a care-of address CoA1 within the wireless zone 118, while the corresponding relationship between the care-of address CoA1, which may change when the mobile terminal moves, and the fixed home address HA is kept track of by the home agent 108. The correspondent node 124, in a case of knowing the care-of address CoA1 when transmitting a communications signal to the mobile terminal 114 within the wireless zone 118, designates CoA1 as header information indicating where the communications signal is destined for so as to route the communications signal by means of the third router 106 to the first router 102, causing the communications signal to arrive at the mobile terminal 114 under the control of the first router 102. On the other hand, the correspondent node 124, in a case of not knowing the care-of address CoA1 and knowing only the home address HA, designates HA as the information indicating where the communications signal is destined for so as to route the communications signal from the third router 106 by means of the home agent 108 to the first router 102, causing the communications signal to arrive at the mobile terminal 114 under the control of the first router 102.

Once the mobile terminal 114 moves to enter a neighboring wireless zone 122, the mobile terminal 114 obtains another care-of address CoA2 to be used within the wireless zone 122. It is desirable that this care-of address CoA2 be used in case the mobile terminal 114 shifts to the wireless zone 122 and communicates therein. Thus, after shifting from the one wireless zone to another, the mobile terminal 114 transmits to the home agent 108 an instruction signal indicating that a care-of address for associating with the home address HA should be changed from CoA1 to CoA2. Moreover, the mobile terminal 114 transmits to the first router 102, by which the mobile terminal 114 was being controlled originally, an instruction signal indicating that a communications signal destined for CoA1 should be encapsulated as destined for CoA2 so as to transfer to CoA2. Furthermore, the mobile terminal 114 as needed transmits also to the correspondent node 124 an instruction signal indicating a change in the care-of address. These instruction signals are called Binding-Update signals.

The correspondent node knowing only the home address HA setting where the communications signal is destined for as the home address HA makes it possible to transmit the communications signal to the mobile communications terminal 114 through the home agent 108 and the second router 104. The communications signal routed for the previous care-of address CoA1, while being routed to the first router 102, is also encapsulated as destined for CoA2 so as to be transmitted to CoA2 so that the signal arrives at the second router 104 in this case also. Thus, regardless of where in the network the mobile terminal moving between the wireless zones is connected to, it becomes possible for the correspondent node to communicate using the same IP address (more specifically, the home address). It is noted that, for the wireless-communications system of the type as described above, there is, for example, a disclosure in the Japanese Publication of Patent Applications 2000-332825A.

On the other hand, a communications signal in a mobile communications environment is influenced by fading which causes a random change in the envelope level of the radio wave. A technology called diversity is often used in order to reduce the influence of fading. Generally, diversity provides at the transmitting side multiple fading waves which change in mutually independent manners so as to be combined at the receiver side. Of the different types of diversity, there is one type such that transmissions are made from each of two or more wireless base-stations as diversity branches (representing nodes to be the transmitters when implementing site diversity) so as to try to improve the transmission quality of a communications signal in the vicinity of a border of wireless zones. It is noted that, for the site diversity using such multiple wireless base-stations as described above, there is, for example, a disclosure in an international publication pamphlet number WO 95/32594.

Up to now, site diversity has not been implemented in a Mobile-IP communications environment such as described above. As a communications signal is routed to one destination (an IP address) indicated in the header of the communications signal in Mobile-IP routing, even if one were to implement diversity, it would be difficult to implement the diversity branches themselves, for instance.

SUMMARY OF THE INVENTION

It is a general object of the present invention to provide a technology for Mobile-IP (Internet Protocol) compliant mobile communications that substantially obviates one or more problems caused by the limitations and disadvantages of the related art.

It is a more particular object of the present invention to provide a wireless communications system, and a relaying apparatus and a mobile terminal that are for use therein.

According to the invention, a wireless-communications system implementing site diversity includes multiple communications nodes which may become diversity branches, a relaying apparatus for relaying a communications signal, and a mobile terminal which is able to use an IP address associated with a home address to move between wireless zones which the communications nodes form. The relaying apparatus has transmitting means for transmitting a received communications signal destined for the IP address, based on an instruction signal generated in response to a request of the mobile terminal for the site diversity, to at least two communications nodes including a communications node indicated in the instruction signal. The at least two communications nodes have transmitting means for transmitting the communications signal received to the mobile terminal, and the mobile terminal has receiving means for receiving a communications signal from each communications node.

According to another aspect of the invention, a relaying apparatus for relaying a communications signal, in a wireless-communications system having multiple communications nodes which may become diversity branches, and a mobile terminal which is able to use an IP address associated with a home address to move between multiple wireless zones which the communications nodes form, includes duplicating means for duplicating a received communications signal destined for the IP address, based on an instruction signal generated in response to a request of the mobile terminal for site diversity, and transmitting means for encapsulating, so that the mobile terminal receives a communications signal from each of at least two communications nodes including a communications node indicated in the instruction signal, and one or more communications signals for transmitting the encapsulated communications signals to the at least two communications nodes.

According to yet another aspect of the invention, a mobile terminal, which is able to use an IP address associated with a home address to move between wireless zones formed by communications nodes, each of which may become a diversity branch, includes transmitting means for transmitting, so that a relaying apparatus for relaying a communications signal duplicates a received communications signal destined for the IP address so as to transmit the duplicated communications signals to each of at least two communications nodes, an instruction signal to the relaying apparatus, and receiving means for receiving from the communications nodes at least two communications signals including one or more decapsulated communications signals.

Other objects and further features of the present invention will be apparent from the following detailed description when read in conjunction with the accompanying drawings.

BRIEF DESCRIPTION OF THE DRAWINGS

FIG. 11 is a flowchart for describing an operation according to the second embodiment of the present application.

DETAILED DESCRIPTION OF THE PREFERRED EMBODIMENTS

In the following, embodiments of the present invention are described with reference to the accompanying drawings.

A First Embodiment

Figure 1:
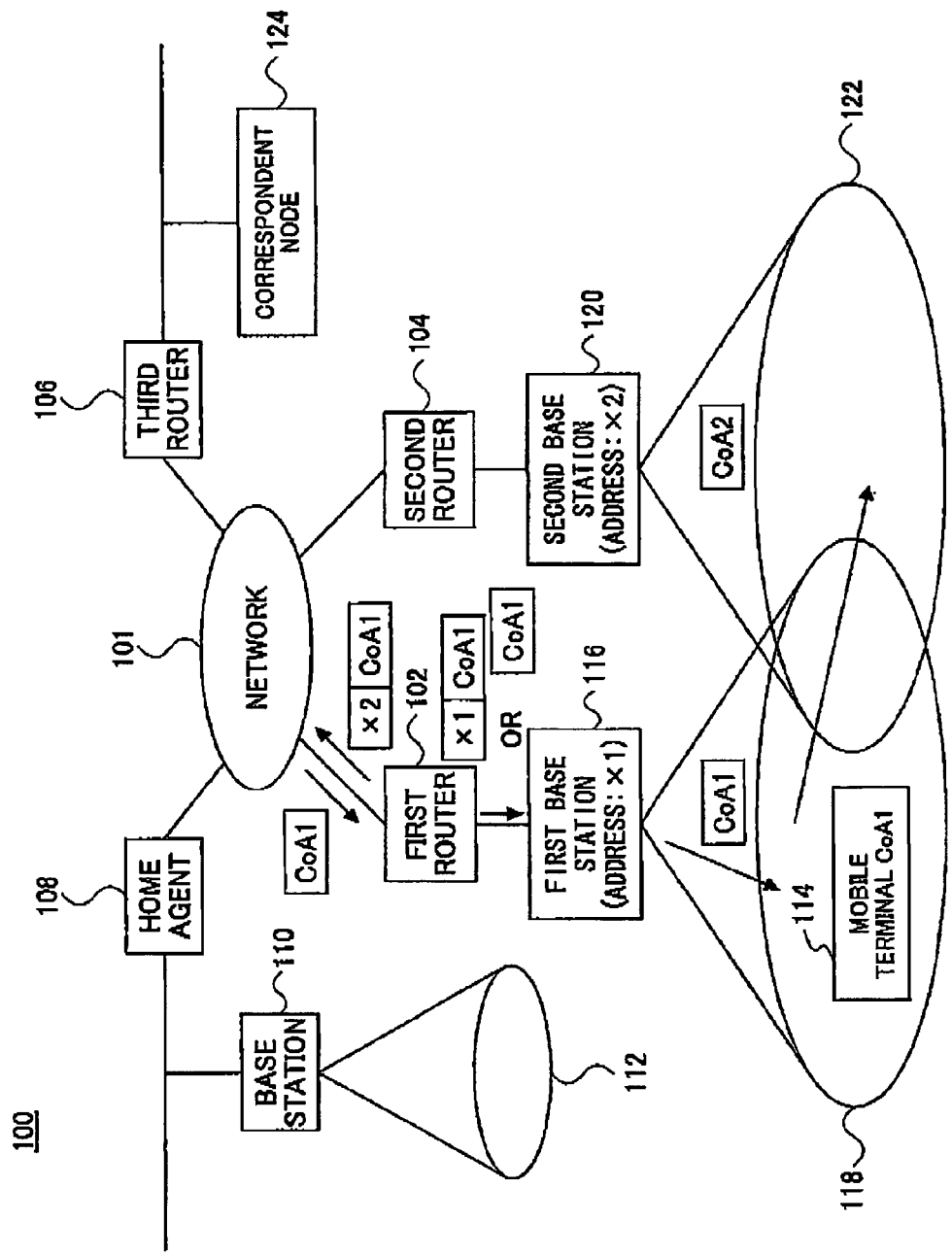
FIG. 1 is a schematic diagram of a wireless-communications system in which the present invention can be used.
Figure 2:
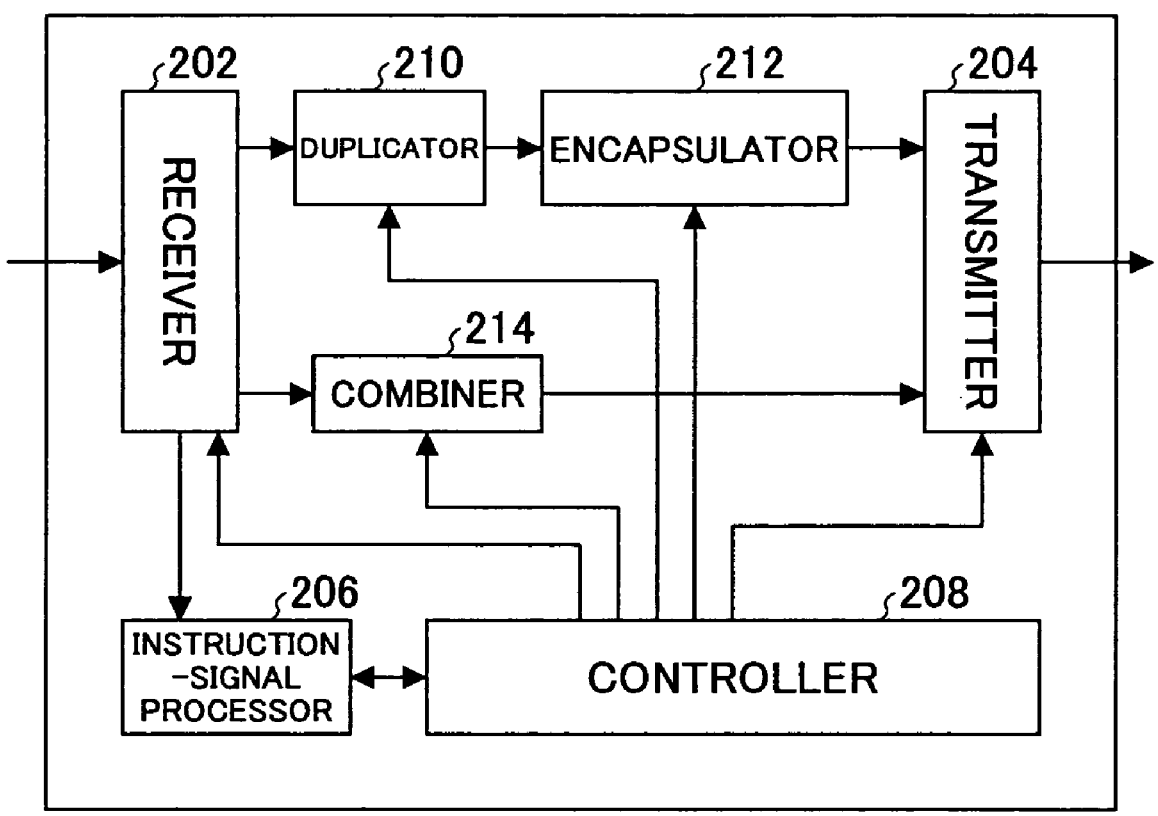
FIG. 2 is a functional block diagram of a relaying apparatus according to embodiments of the present application.

FIG. 2 is a functional block diagram with respect to major functions of a relaying apparatus 200 according to embodiments of the present application, the relaying apparatus being able to be used as the first or third router in the wireless-communications system as illustrated in FIG. 1. The relaying apparatus 200 has a receiver 202 and a transmitter 204 for receiving a communications signal from a network or a wireless base-station under the control of the network and for transmitting a communications signal to the network or the wireless base-station. The relaying apparatus 200 has an instruction-signal processor 206 connected to the receiver 202 for analyzing the contents of an instruction signal originating from a mobile terminal or another relaying apparatus or generating a desired instruction signal. The output of the instruction-signal processor 206 is connected to a controller 208 for controlling each section within the relaying apparatus 200. The relaying apparatus 200 has a duplicator 210 connected to the receiver 202 for duplicating a communications signal under the control of the controller as described above. The relaying apparatus 200 has an encapsulator 212 connected to the output of the duplicator 210 for encapsulating required when transmitting a communications signal to a destination indicated by the instruction signal. A communications signal encapsulated at the encapsulator 212 is transmitted to the network by the transmitter 204.

On the other hand, multiple communications signals received from multiple wireless base-stations by the receiver 202 are input to the combiner 214 so as to be combined. The combined communications signals are transmitted to an upper-level apparatus (not illustrated) in the wireless-communications system such as an exchange. The combining here may be selecting one communications signal having the best quality out of the multiple communications signals, or using such methods as a maximum ratio-combining to form a linear coupling of the multiple communications signals.

Figure 3:
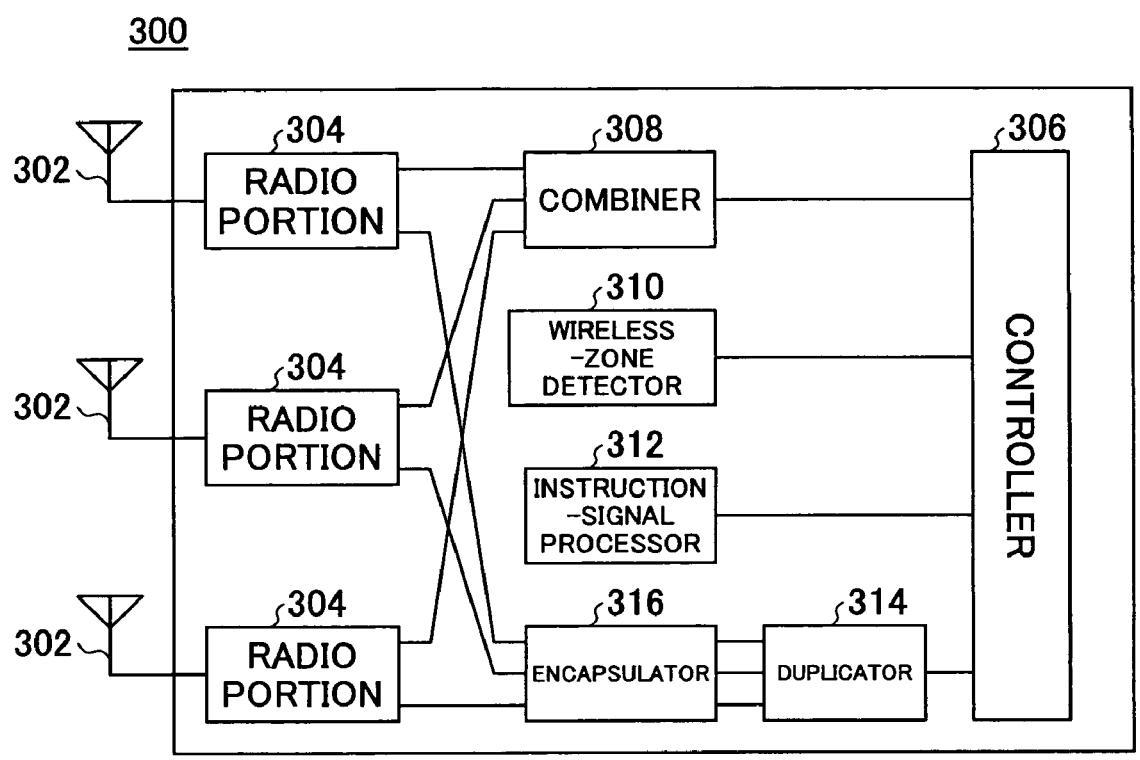
FIG. 3 is a functional block diagram of a mobile terminal according to the embodiments of the present application.

FIG. 3 is a functional block diagram with respect to major functions of a mobile terminal 300 according to the embodiments of the present application. The mobile terminal 300 has antenna portions 302 and radio portions 304 for communicating with multiple wireless radio base-stations (three in the example illustrated). With respect to a downlink communications signal, in each of the radio portions 304, demodulating of a communications signal received from the corresponding antenna portion 302, compensating for the phase of the demodulated communications signal, and compensating for the amplitude level using the amplifier, etc., are performed based on a parameter (for instance, a spread code) determined per wireless base-station. The mobile terminal 300 has a controller apparatus 306 for controlling each part within the communications terminal. The outputs from each of the radio portions 304 are combined at a combiner 308 under the control of the controller 306.

The combining here may also be selecting one communications signal having the best quality out of the multiple communications signals, or using such methods as a maximum ratio-combining to form a linear coupling of the multiple communications signals.

With respect to an uplink communications signal, a communications signal to be transmitted is duplicated at a duplicator 314 under the control of the controller 306 so that the duplicated signal is encapsulated at an encapsulator 316 as needed per wireless base-station. Then, the encapsulated communications signals are transmitted through each of the radio portions 304 and the antenna portions 302 to multiple wireless base-stations to be diversity branches.

The mobile terminal 300 has a wireless-zone detector 310 for detecting that the mobile terminal has entered a new wireless zone. While this detecting can be determined based on a receiving power level of a control signal transmitted from each wireless base-station, it is not necessarily limited to such method. When a new wireless zone is detected, processes for performing a handover such as securing communications resources are initiated by the controller 306. The mobile terminal 300 has an instruction-signal processor 312 for generating an instruction signal to a home agent of the mobile terminal, a router by which the mobile terminal was being controlled prior to handover, a correspondent node, etc., and analyzing the contents of the received instruction signal. Unlike a conventional instruction signal, an instruction signal according to the present embodiment includes not only, as a matter of course, information for reporting a change of a care-of address that is caused by a handover of a mobile terminal, but also further sets of additional information as described below. While the sets of additional information may include the IP address of a communications node for duplicating a communications signal, the number to be duplicated, the IP address of the wireless base-station to which the duplicated communications signal is to be transferred to, a communications node for combining communications signals, the number of communications signals to be combined, and a validity period for all or a part of the contents of an instruction, they are not limited to such sets as described above.

Figure 4:
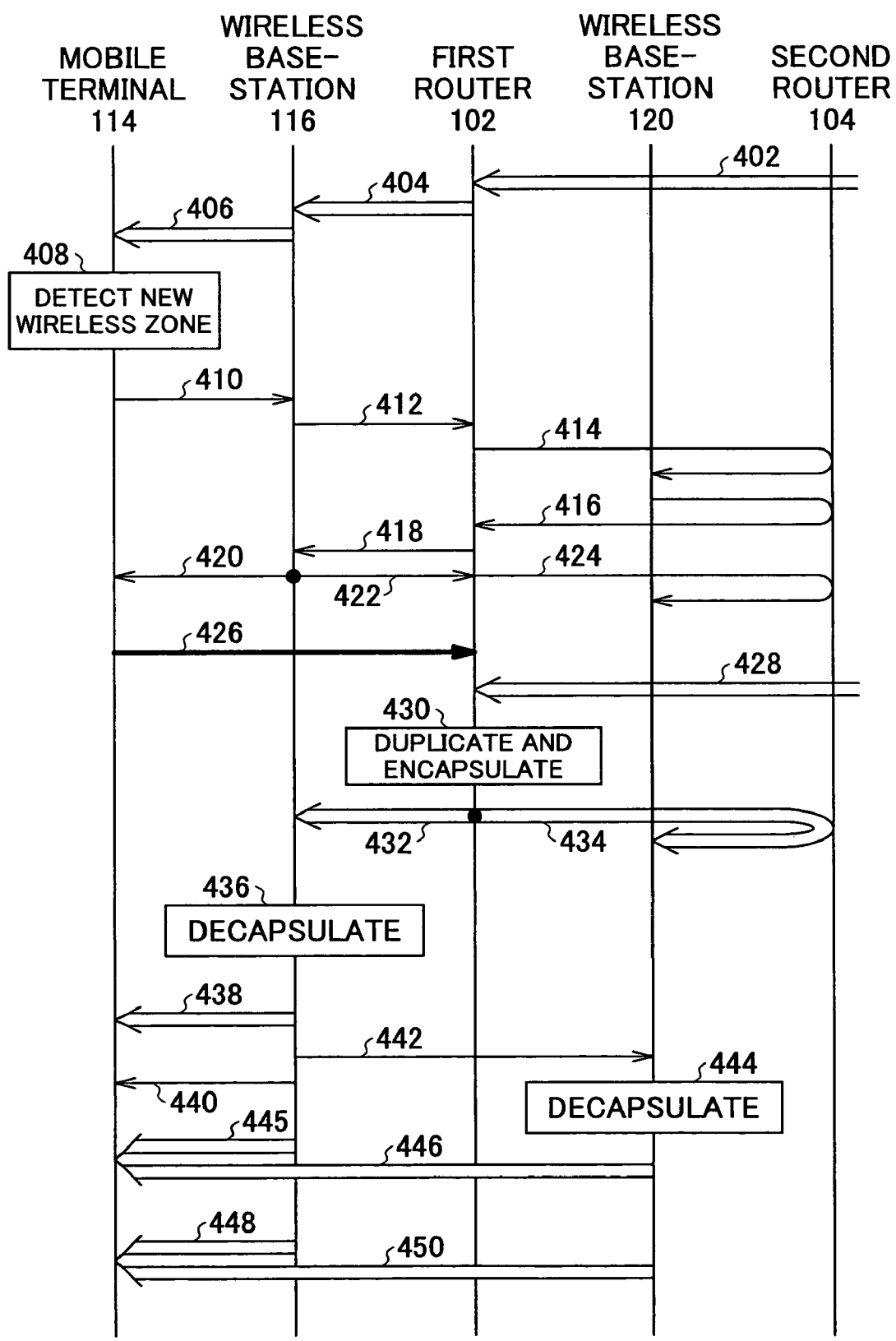
FIG. 4 is a flowchart for describing an operation according to a first embodiment of the present application.

FIG. 4 is a flowchart for describing an operation according to the present embodiment. For a convenience of explanation, it is assumed that a mobile terminal 114 having a home address HA is located within a wireless zone 118 of a first wireless base-station 116 and communicating with a correspondent node 124. The mobile terminal 114 has obtained a care-of address CoA1 within the first wireless zone 118, while the corresponding relationship between the care-of address CoA1 and a home address HA is kept track of at a home agent 108. Then it is assumed that the mobile terminal 114 belonging to the wireless zone 118 moves such as to shift to a neighboring second wireless zone 122.

As illustrated in step 402, a communications signal from the correspondent node 124 is routed directly to a first router 102 when the signal is destined for the care-of address CoA1, or the signal is routed indirectly to the first router 102 via a home agent when the signal is destined for the home address HA. In either case, the communications signal arriving at the first router 102, as illustrated in steps 404 and 406, is routed to the communications terminal 114 via the wireless base-station 116. It is assumed that, in the present embodiment, at least the first router 102 has the various parts as illustrated in the relaying apparatus 200 in FIG. 2, while the mobile terminal 114 has the various parts as illustrated in FIG. 3 as well.

As illustrated in step 408, once the mobile terminal 114 enters a region where wireless zones overlap, the mobile terminal 114 detects by the wireless-zone detector 310 (FIG. 3) that it has entered a new wireless zone. This detecting may be performed, for instance, by determining at the controller 306 whether the receiving level of a control signal which is transmitted from the wireless-base station 120 periodically or regularly has exceeded a predetermined value. When the mobile terminal 114 enters the second wireless zone 122, it obtains a care-of address CoA2 to be used within the wireless zone. The care-of address may be set such that, for instance, a lower address which is created based on information specific to the mobile terminal 114 and an upper address which is created based on area information of a wireless zone are merged so that the merged result is set as a care-of address. Or a method such as a DHCP (Dynamic Host Configuration Protocol) that manages IP addresses may be used to manage allocation of care-of addresses to the mobile terminals. It is noted that the area information is transmitted by each wireless base-station.

Now, once the detecting is performed in step 408, the mobile terminal 114 as illustrated in steps 410, 412 and 414 requests for a process required to implement site diversity within the region where the wireless zones overlap. More specifically, the mobile terminal requests via the wireless base-station 116 to the wireless base-station 120 for establishing a wireless link for communicating within the second wireless zone 122. In response to this request, the wireless base-station 120 and an upper-level apparatus for wireless communications (not illustrated), in steps 416 and 418 return a response signal to the wireless base-station 116 and also allocate communications resources for wirelessly linking with the mobile terminal 114. The wireless base-station 116, as illustrated in step 420, returns to the mobile terminal 114 a response to the request as described above and, as illustrated in steps 422 and 424, sends a confirmation of the response signal to the wireless base-station 120.

As illustrated in step 426, the mobile terminal 114 under the control of the controller 306 transmits via the wireless base-station 116 to the first router 102 an instruction signal generated at the instruction-signal processor 312 (FIG. 3). The contents of the instruction of the instruction signal in this case include, for example:

(a) for the first router 102 to duplicate a communications signal received from the network;

(b) for the first router 102 to transmit one of the (two duplicated) communications signals to the wireless base-station 116;

(c) the first router 102 transmitting the other of the communications signals to the wireless base-station 120 (implemented, for example, by reporting the address of the wireless base-station 120 (receiving a control signal of the wireless base-station 120 makes it possible for the mobile terminal 114 to obtain the address); and (d) validity periods for all or a part of the instruction contents. This instruction signal is received by the receiver 202 of the first router 102 and the instruction contents of the signal are analyzed at the instruction-signal processor 206. It is noted that these sets of information are held in a memory (not illustrated) which the instruction-signal processor has.

As illustrated in step 428, when a communications signal arrives at the first router 102 from a correspondent node, etc., as illustrated in step 430, according to the instruction contents of the instruction signal, the first router 102, using the duplicator 210 (FIG. 2), duplicates the communications signal and provides for two communications signals. Then, using the encapsulator 212 (FIG. 2), an IP header destined for the wireless base-station 116 of the first wireless zone 118 is added to one of the communications signals so as to encapsulate the signal, and similarly an IP header destined for the wireless base-station 120 of the second wireless zone 122 is added to the other of the communications signals so as to encapsulate the signal.

As illustrated in steps 432 and 434, the respective encapsulated communications signals are transmitted to each of the wireless base-stations 116 and 120.

As illustrated in step 436, the communications signals are decapsulated at the wireless base-station 116 and, as illustrated in step 438, the communications signals are transmitted to the mobile terminal 114.

As illustrated in steps 440 and 442, timing information regarding the mobile terminal 114 is reported from the wireless base-station 116 to the mobile terminal 114 and the wireless base-station 120. In other words, in order to make it possible to transmit a communications signal in synch with the wireless base-station 120, in addition to a timing of a wireless frame that initiates site diversity, a relationship between the timing and, a serial number which is incremented per transmission of such data as a packet number, for example, is reported.

As illustrated in step 444, the communications signals are decapsulated at the wireless base-station 120, and as illustrated in steps 445 and 446, the communications signals are transmitted from both the wireless base-stations 116 and 120 to the mobile terminal 114. In this case, as data sets having corresponding wireless frames and serial numbers are transmitted to the mobile terminal 114 based on the timing information from the wireless base-station 116, transmissions in synch with each other are possible. It is noted that the temporal sequence for decapsulating and the timing of reporting the transmission timing are not limited to those illustrated. This is because it suffices that the communications signals 445 and 446 which are transmitted from corresponding wireless base-stations are received at the mobile terminal 114 while maintaining consistency. At the mobile terminal 114 these communications signals received are to be combined for performing a receiving process (not illustrated) at a latter stage.

As illustrated in steps 448 and 450, in a similar manner for the subsequent process, a communications signal destined for the mobile terminal 114 which is located in a region where wireless zones overlap is duplicated after which the respective duplicated communications signal is transmitted from each wireless base-station to the mobile terminal 114 for implementing site diversity. At the mobile terminal 114 side, these communications signals are combined at the combiner 308 (FIG. 3).

Thus, the first router 102 encapsulates the communications signal destined for each wireless base-station, and, in principle, each wireless base-station decapsulates the encapsulated signal and each decapsulated communications signal is transmitted to a mobile terminal which is under the control of the corresponding wireless base-station. To be more precise, the encapsulating in this case would be such as to encapsulate a communications signal from a correspondent node for destinations to which the communications signals are transferred that are indicated in an instruction signal (the IP addresses to which the signals are to be transferred) However, when the originating address of the instruction signal transmitted in step 426 is a care-of address CoA1 in a first wireless zone, it is possible to simplify such process as described above. In other words, for transmitting a communications signal to the wireless base-station 116, a communications signal destined for CoA1 that the first router 102 receives is suitably routed so as to arrive at the mobile terminal 114 without encapsulating the communications signal for the wireless base-station 116. Therefore, when the originating address of the instruction signal falls under the control of the first router which performs such processes as duplicating the communications signal, etc., encapsulating for the wireless base-station under the control of the first router may be eliminated.

Moreover, the mobile terminal in a region where wireless zones overlap may use the newly-obtained care-of address CoA2. Then, a case of using the newly-obtained care-of address CoA2 for the originating address of the instruction signal in step 426 is considered. As for encapsulating in step 430 for the wireless base-station 120 of the second wireless zone, on a communications signal destined for CoA1 that is from a correspondent node, a first encapsulating for CoA2 from the first router 102 and also a second encapsulating for the wireless base-station 120 from the first router 102 are to be performed. In the wireless base-station 120, the second encapsulating is decapsulated so as to transmit the decapsulated communications signal to a mobile terminal having an address of CoA2 under the control of the wireless base-station 120. However, the second encapsulating in this case is not mandatory. Even when the first router 102 transmits a communications signal at the time a normal encapsulating (the first encapsulating) in which an originating address (CoA2) of an instruction signal is set to be a destination address is performed, the signal reaches the mobile terminal 114 via the second router 104 and the wireless base-station 120 under its control. Thus, when the originating address of the instruction signal is the care-of address provided at a wireless zone to move to, encapsulating may be simplified.

Figure 5:
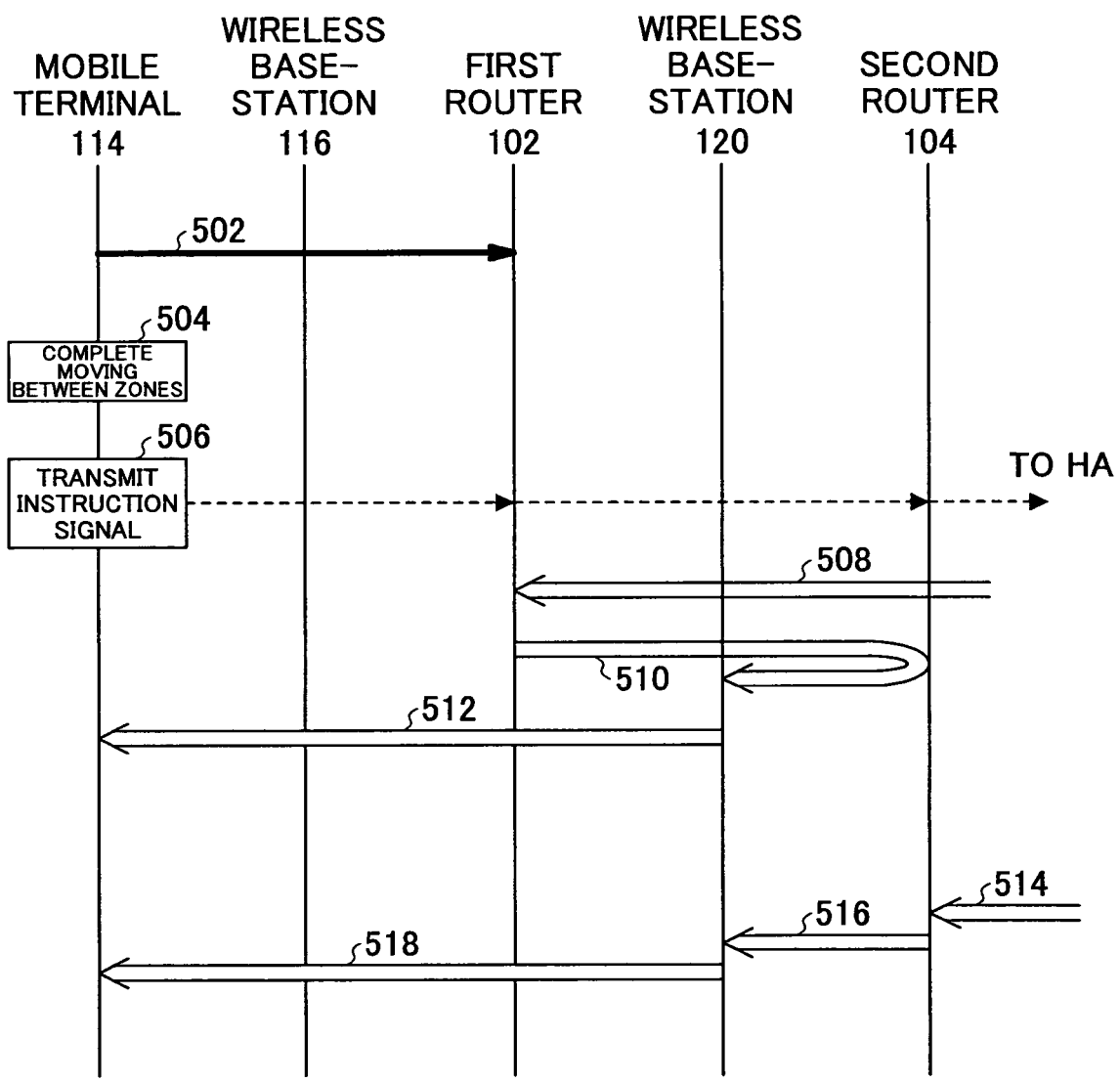
FIG. 5 is another flowchart for describing the operation according to the first embodiment of the present application.

FIG. 5 is a flowchart illustrating the operation subsequent to the flow illustrated in FIG. 4. While the mobile terminal 114 moves between the wireless zones, it is desirable to implement site diversity through each wireless base-station related to the wireless zone moved from and the wireless zone moved to from a point of view of improving transmission quality. On the other hand, for all or a part of the contents of the instruction performed by the instruction signal in step 426, it is possible to specify the validity period. This is advantageous from a point of view of not unnecessarily prolonging duplicating, encapsulating and transferring, etc., of the communications signal. However, it is not desirable that the validity period expires in the middle of shifting between wireless zones. Therefore, when the validity period is likely to expire prior to the mobile terminal 114 completing a shift, as illustrated in step 502, it is desirable that a instruction signal having the same contents be retransmitted so as to extend the validity period.

For instance, after it is detected that a control-signal level from the wireless base-station 116 is at or below a predetermined value so that the mobile terminal 114 completes shifting between wireless zones (step 504), as the various processes for site diversity are no longer needed, it is necessary to terminate these processes. Several methods may be considered for the terminating as described above. For example, when the validity period as described above expires, a duplicating, etc. of the communications signal is no longer performed. Moreover, an instruction signal to report a suspension of the duplicating, etc. may be issued, or a wireless link with the originating location may be cut, so as to terminate the processes.

As illustrated in step 506, the mobile terminal 114 completing a shift to the wireless zone 122 reports a change of address to the home agent 108, the first router 102 and the correspondent node 124. First, to the home agent, it is reported that a care-of-address associated with a home address HA is to be changed from CoA1 to CoA2. Hereby, a communications signal routed via the home agent thereafter is to be routed to the second router 104. Moreover, the mobile terminal 114 reports to the first router 102 of the originating location that the communications signal destined for the care-of address CoA1 is to be encapsulated destined for CoA2 for transferring. Furthermore, desirably the fact that the care-of address changed from CoA1 to CoA2 is reported also to the correspondent node 124.

According to the present embodiment, a mobile terminal transmits an instruction signal after completing a shift between wireless zones. The likelihood of the mobile terminal, while moving from one zone to the other, returning to the one zone without shifting to the other is not small. In addition, communicating between the mobile terminal and its home agent may take a relatively long time due to the length of the communications path, the processing speed of equipment being passed through, etc. Thus, for example, when changing an IP address (CoA1) associated with the home address to a care-of address (CoA2) for the other wireless zone before completing a shift between the zones, a mobile terminal returning to the one wireless zone without shifting to the other zone could lose data via the home agent. Transmitting the instruction signal in step 506 after completing the shift between the wireless zones makes it possible to avoid such inconvenience as described above.

As illustrated in step 508, even after the change of address is reported in step 506, it takes some time for the contents of the change to be reflected in all communications nodes. Moreover, even though the change of address is reflected in all communications nodes to which the reporting as described above is made, a correspondent node knowing only a prior address CoA1 may exist. Thus, it is anticipated that communications signals continue to be routed to the old address CoA1. In this case, at any time before receiving a report of a change of address in step 506, the first router 102 performs the processes of duplicating, encapsulating, and transferring, etc., of the communications signal as described above.

At any time after receiving a report in step 506, as illustrated in steps 510 and 512, a communications signal which undergoes normal encapsulating (encapsulating destined for a destination address (CoA2) of the instruction signal) without duplicating is routed to the mobile terminal 114 via the second router 104 and the wireless base-station 120.

As illustrated in steps 514, 516, 518, the communications signal destined for the new address CoA2 is routed to the second router 104 and is routed via the wireless base-station 120 under its control to the mobile terminal 114.

Figure 6:
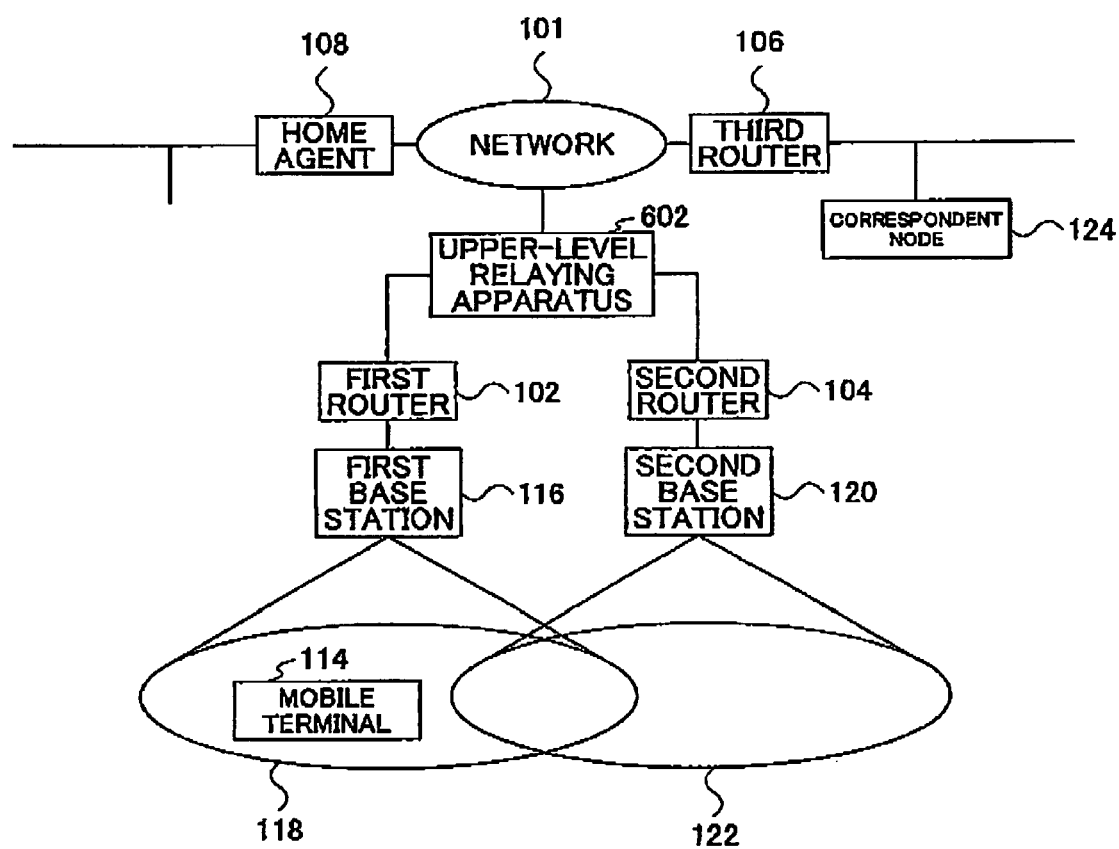
FIG. 6 is a diagram of a wireless communications system in which the present invention can be used.

FIG. 6 illustrates an overview of a wireless-communications system which is hierarchical Mobile-IP compliant. As illustrated, elements which are the same as those described in FIG. 1 are given the same reference numbers. This wireless-communications system has a first router 102 and a second router 104 that are under its control, and an upper-level relaying apparatus 602 connected to a network 101. This upper-level relaying apparatus 602, also called a Mobility-Anchor Point, distinguishes communications within regions 118 and 122 under its control, and communications conducted between the regions so as to make high-speed communications possible.

In the embodiment as described above, the first router 102 which is able to route a communications signal directly with another router connected to the network is made to perform duplicating and encapsulating, etc., of the communications signal. However, providing the relaying apparatus according to the present invention (FIG. 2) at a node such as the first router 102 is not necessary. The apparatus may be provided not only at the second router 104 to shift to, as a matter of course, but also at the upper-level relaying apparatus 602. Moreover, the apparatus may be provided at a home agent 108, a third router 106, and also the same function as the relaying apparatus (FIG. 2) may be provided at a correspondent node 124.

Figure 7:
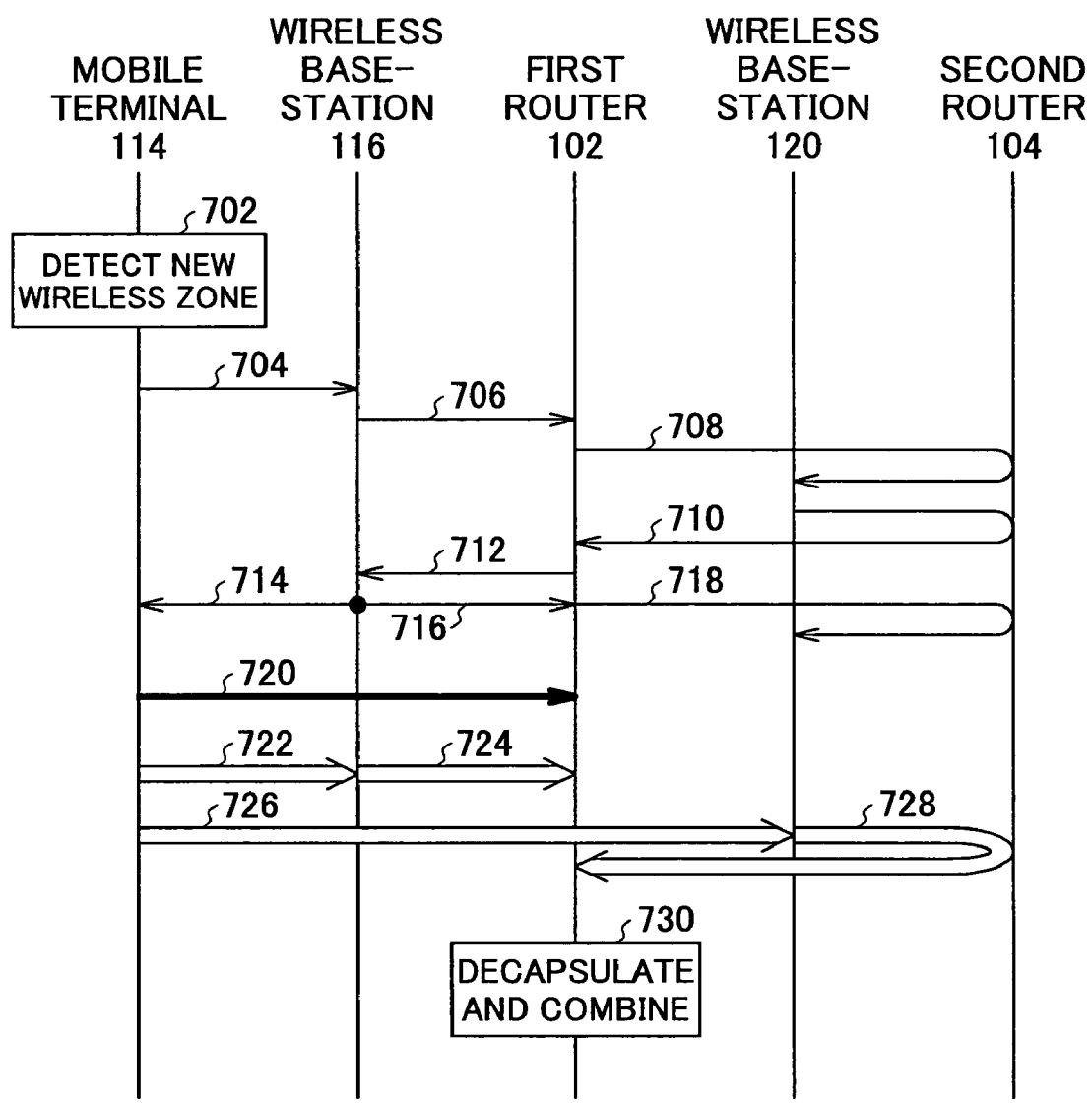
FIG. 7 is a flowchart for describing an operation according to the first embodiment of the present application.

FIG. 7 is a flowchart illustrating a procedure for implementing site diversity with respect to an uplink signal. It is assumed that a communications terminal 114 shifts from a first wireless zone 118 to a neighboring second wireless zone in the same manner as in a case of a downlink signal described primarily in connection with FIG. 4. As illustrated in step 702, once the mobile terminal 114 enters a region where wireless zones overlap, the mobile terminal 114 detects by the wireless-zone detector 310 (FIG. 3) that it has entered a new wireless zone.

As illustrated in steps 704, 706 and 708, the mobile terminal 114 requests for a process required to implement site diversity within the region where the wireless zones overlap. Reporting to the wireless-base station 120 to be one diversity branch is performed via the first router 102 and the second router 104. More specifically, the mobile terminal requests for establishing a wireless link for communicating within the second wireless zone 122. In response to this request, the wireless base-station 120 and an upper-level apparatus for wireless communications, in steps 710 and 712 return a response signal and also allocate communications resources for the wireless link. The wireless base-station 116, as illustrated in step 714, returns to the mobile terminal 114 a response to the request as described above and, as illustrated in steps 716 and 718, sends a confirmation of the response signal to the wireless base-station 120.

As illustrated in step 720, the mobile terminal 114 under the control of the controller 306 transmits to the first router 102 an instruction signal generated at the instruction-signal processor 312 (FIG. 3). The contents of the instruction of the instruction signal in this case include, for example:

(a) for the first router 102 to receive communications signals from two wireless base-stations and to combine based on the received communications signals;

(b) for the first router 102 to receive a communications signal from the wireless base-station 116;

(c) for the first router 102 to receive a communications signal from the wireless base-station 120; and (d) the validity period for all or a part of the instruction contents.

This instruction signal is received by the receiver 202 of the first router 102 and the instruction contents of the signal is analyzed at the instruction-signal processor 206.

In steps 722 and 726, a respective communications signal is transmitted from the mobile terminal 114 to each of the wireless base-stations 116 and 120. It is noted that encapsulating is performed such that a communications signal not transmitted to a first wireless base-station eventually reaches the first router 102.

As illustrated in step 724, the communications signal transmitted to the first wireless base-station 116 is transmitted as it is to the upper-level first router 102.

As illustrated in step 728, the communications signal transmitted to the second wireless base-station 120 is transmitted via the second router 104 to the first router 102.

As illustrated in step 730, the first router 102 combines at the combiner 214 (FIG. 2) communications signals received from each wireless base-station after undergoing necessary decapsulating and transmits the combined communications signal to the network side.

In the same manner as the site diversity for the downlink signal, the site diversity for the uplink signal may be terminated in accordance with expiring of the validity period indicated by an instruction signal, and instruction signals for cutting a wireless link, terminating the site diversity for the uplink signal, etc.

A Second Embodiment

Figure 8:
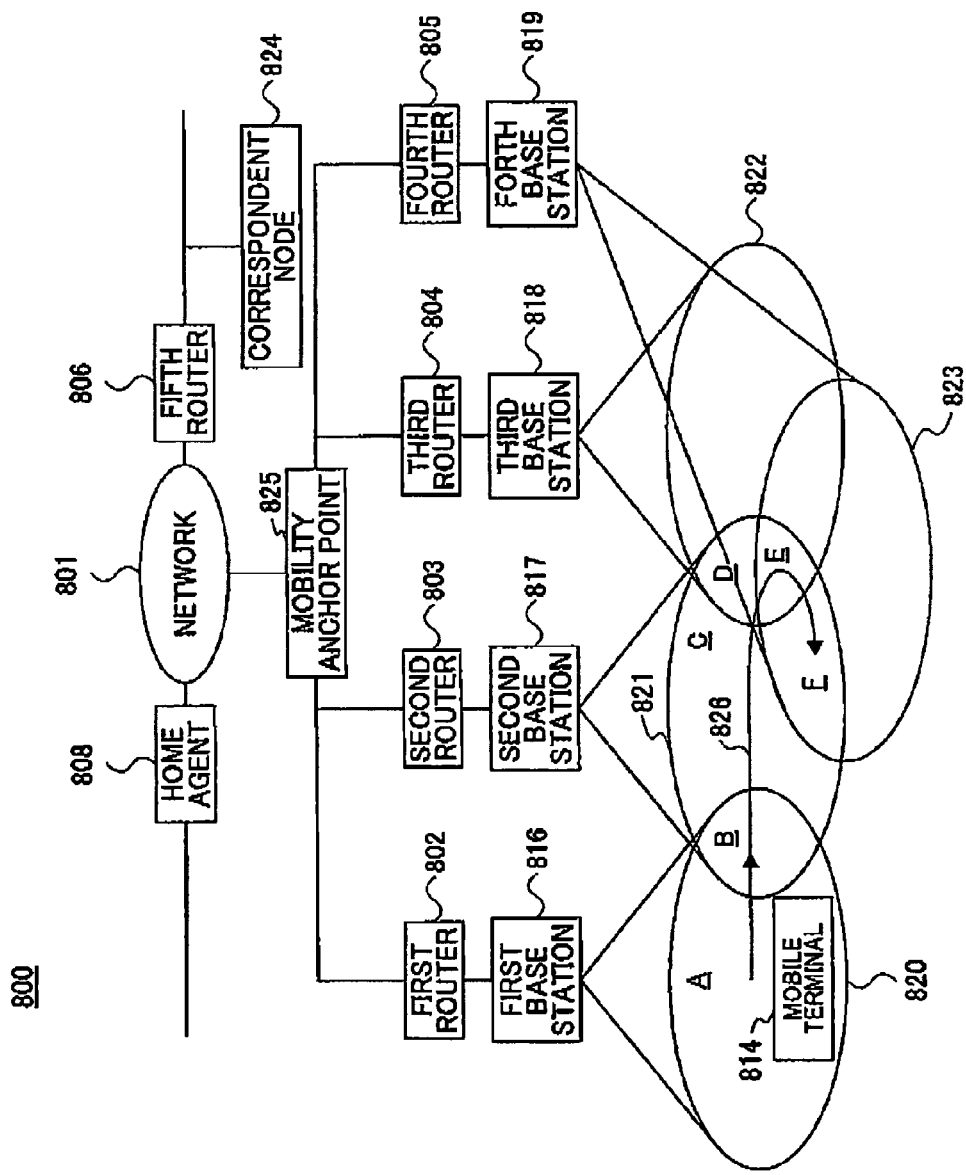
FIG. 8 is a diagram of a wireless communications system according to a second embodiment of the present application.

FIG. 8 is a schematic diagram of a wireless-communications system according to a second embodiment of the present application. This system is one example of the mobile-communications system which is hierarchical Mobile-IP compliant that is as described in connection with FIG. 6. Within a wireless-communications system 800, each system element may route a communications signal with the other system elements through a network 801 such as the Internet, for instance. The wireless-communications system 800 has a first router 802, a second router 803, a third router 804 and a fourth router 805 that may communicate via a mobility anchor point 825 with a fifth router 806 and a home agent 808 that are connected to the network 801. Moreover, the wireless-communications system 800 has multiple wireless base-stations with which each wireless zone forming a wireless service-area is associated. A mobile terminal 814 has a specific IP address (a home address) which does not change with moving between wireless zones. The corresponding relationship between the home address and a care-of address as described below is managed at the home agent.

A first wireless base-station 816 connected to the first router 802 under its control wirelessly communicates with a mobile terminal within a first wireless-zone 820. Similarly, each of a second wireless base-station 817 connected to the second router 803 under its control, a third wireless base-station 818 connected to the third router 804 under its control, and a fourth wireless base-station 819 connected to the fourth router 805 under its control may communicate with a mobile terminal in respectively corresponding second, third, and fourth wireless zones 821, 822 and 823. For convenience of explanation, it is assumed that the first and second wireless-zones 820, 821 neighbor each other, while the second, third, and fourth wireless-zones 821, 822, 823 neighbor one another. A correspondent node 824 is connected to the fifth router 806 under its control Next, transmitting and receiving a communications signal in this wireless-communications system are explained. It is assumed for the explanation that the mobile terminal 814 having a home address HA is located within a region A of the wireless zone 820 of the first wireless base-station 816 and is communicating with the correspondent node 824. While the mobile terminal 814 obtains a care-of address CoA1 within the wireless zone 820, the corresponding relationship between the care-of address CoA1 and the home address HA is kept track of at the home agent 808. It is assumed that this mobile terminal 814, as illustrated in an arrowed line 826, moves between wireless zones. In the present embodiment, the mobile terminal 814 may continue using the initial care-of address CoA1 even when entering a wireless zone other than the first wireless zone without changing the address of the mobile terminal. Such feature as described above is advantageous in a case of having no time for changing the address when moving at high speed between the wireless zones.

Figure 9:
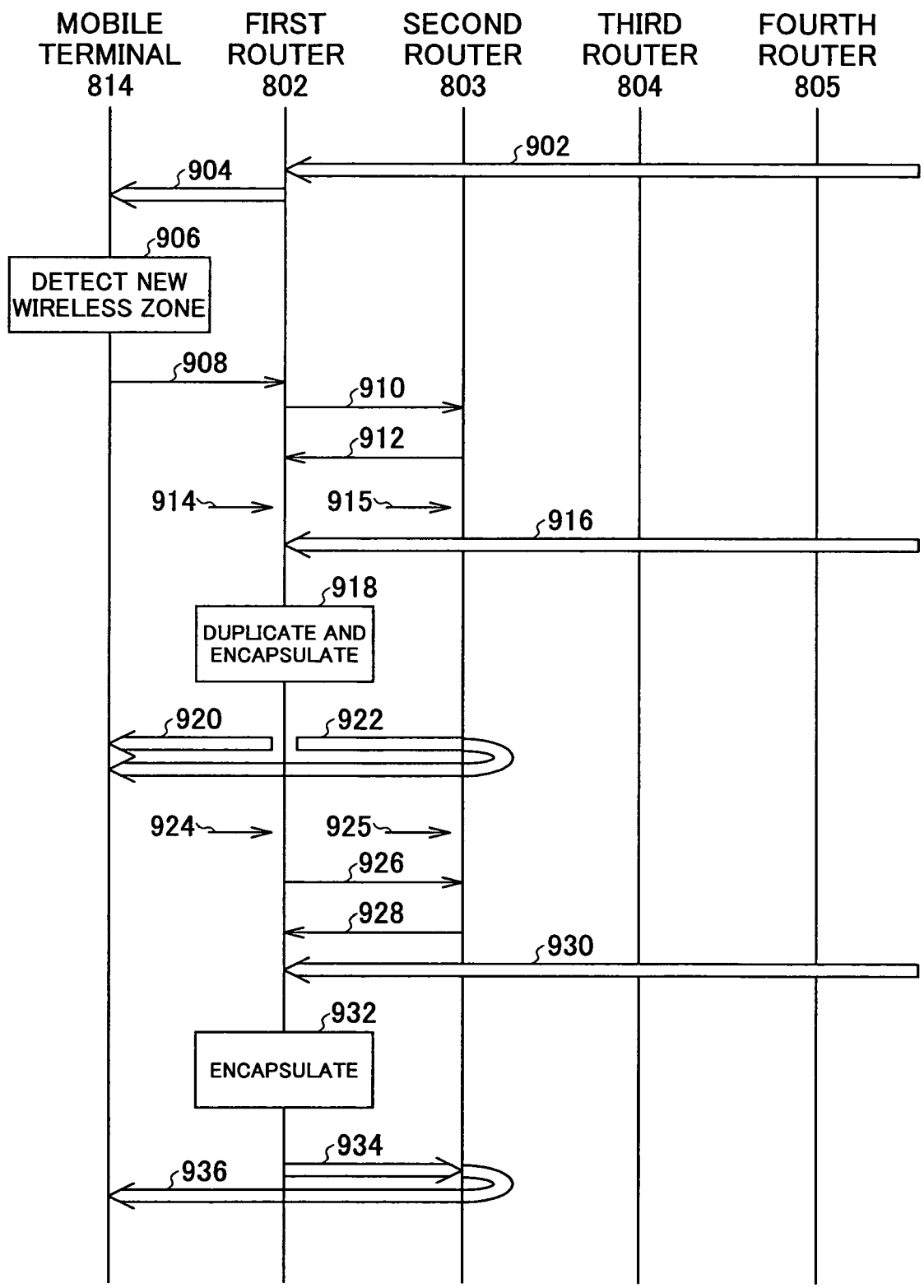
FIG. 9 is a flowchart for describing an operation according to the second embodiment of the present application.

FIG. 9 is a flowchart for describing an operation according to the second embodiment of the present application. For ease of understanding, while each wireless base-station under the control of the corresponding router is omitted, in actuality, a respective wireless base-station relaying a signal lies between the mobile terminal 814 and each of the routers 802 through 805. As illustrated in steps 902 and 904, a communications signal destined for a care-of address CoA1 is routed to the first router 802 for transmitting to the mobile terminal 814 under its control.

As illustrated in step 906, once the mobile terminal 814 enters a region B where the first and second wireless zones overlap, the mobile terminal 814 detects (310) the fact that it has entered the region and determines (306) that site diversity is to be implemented. Then, as illustrated in step 908, the first router 802 handling the communications signal destined for CoA1 receives from the mobile terminal 814 a request for site diversity.

As illustrated in step 910, the first router 802 requests the second router 803 based on the request from the mobile terminal 814. This request is to wirelessly transmit a communications signal received from the first router 802 via the wireless base-station 817 under its control to the care-of address CoA1.

As illustrated in step 912, the second router 803 responds to this request.

As illustrated in steps 914 and 915, when a wireless link with the wireless base-station 817 is established in addition to a wireless link between the mobile terminal 814 and the wireless base-station 816, such fact as described above is reported to the first and second routers 802 and 803. Hereby, preparation for implementing the site diversity is completed.

As illustrated in step 916, subsequently when a communications signal destined for CoA1 is routed to the first router 802, as illustrated in step 918, the communications signal is duplicated and encapsulated. More specifically, a communications signal for transmitting to the wireless base-station 816 under the control of the first router 802 and a communications signal encapsulated for transferring to the second router 803 are provided for. The former signal, as illustrated in step 920, is transmitted to the mobile terminal 814. The latter signal, as illustrated in step 922, is transmitted to the second router 803 where the signal is decapsulated for transmitting via a wireless link under its control to the mobile terminal 814.

As illustrated in steps 924 and 925, once the mobile terminal 814 enters a region C so that site diversity is no longer needed, a communications link with the wireless base-station 816 of the originating wireless zone is cut and the fact is reported to the first and second routers 802 and 803.

As illustrated in step 926, the first router 802 reports to the second router 803 of terminating site diversity, and, as illustrated in step 928, the second router 803 responds to the report. Thereafter, duplicating of a communications signal in the first router 802 is no longer performed. However, encapsulating the communications signal for transferring to the second router 803 continues to be performed. It is noted that the sequential order of steps 926 and 928 may be reversed. In other words, the second router 803 may request of the first router 802 for site diversity to be terminated, based on a report from the mobile terminal 814, so as to have the first router 802 respond to the request.

As illustrated in step 930, when a communications signal destined for CoA1 is routed to the first router 802, as illustrated in step 932, encapsulating destined for the second router 803 is performed on the signal for transmitting to the second router 803 as illustrated in step 934.

As illustrated in step 936, the second router 803 decapsulates the communications signal received from the first router 802 for transmitting the communications signal destined for CoA1 via the wireless base-station 817 to the mobile terminal 814.

Figure 10:
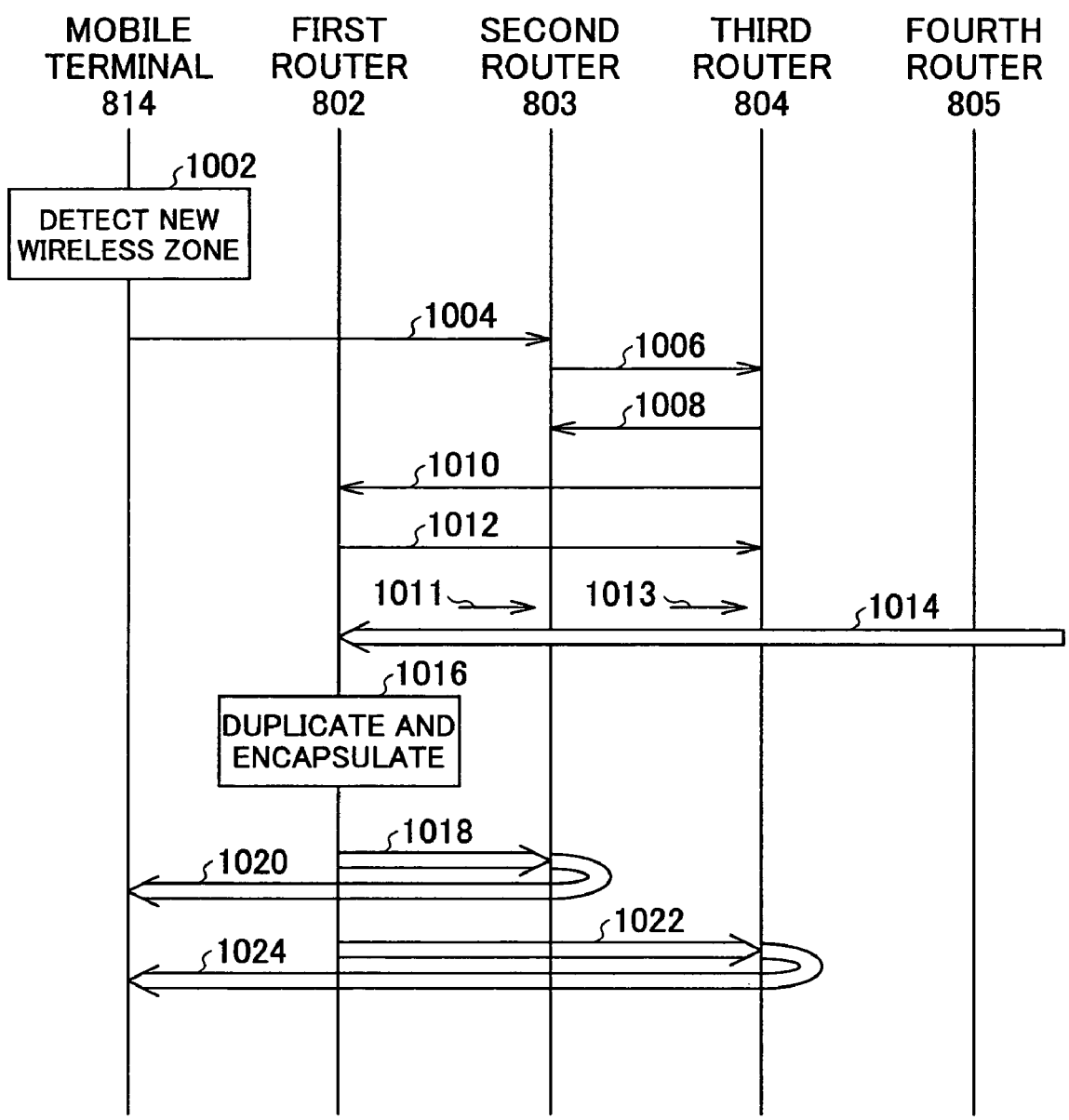
FIG. 10 is a flowchart for describing an operation according to the second embodiment of the present application.

FIG. 10 illustrates a flowchart which continues from the sequence in FIG. 9. As illustrated in step 1002, when the mobile terminal 814 communicating in the region C enters a region D where the second and third wireless zones overlap, the mobile terminal 814 detects the fact that it has entered a new wireless zone.

As illustrated in step 1004, the mobile terminal 814 reports via a wireless link currently being used for communicating (via the wireless base-station 817) to the second router 803 for implementing site diversity using a wireless base-station under the control of the third router 804.

As illustrated in step 1006, the second router 803 requests the third router 804 to obtain a communications signal from the first router 802. As illustrated in step 1008, the third router 804 responds to this request.

As illustrated in step 1010, the third router 804 requests the first router 802 to transfer the communications signal destined for CoA1 based on the request from the second router 803 (1006).

As illustrated in step 1012, the first router 802 responds to this request. Hereby, subsequently when a communications signal destined for CoA1 is routed, the routed signal is duplicated so as to encapsulate the duplicated signals destined for the second router 803 and the third router 804 for transferring. Thus, the request from the third router 804 to the first router 802 in step 1010 has a significance as an instruction signal for causing the first router 802 to duplicate at the router a communications signal so as to encapsulate the duplicated signals. Consideration is needed for the fact that, while this instruction signal is generated solely by a mobile terminal in the first embodiment, a relaying apparatus (the third router 804) is involved in the instruction signal. It is noted that an instruction signal generated in response to a request from a mobile terminal for site diversity is common to both of the embodiments.

As illustrated in steps 1011 and 1013, when a wireless link with a wireless base-station 818 in addition to a wireless link between the mobile terminal 814 and the wireless base-station 817 is established, such fact as described above is reported to the second and third routers 803 and 804.

As illustrated in step 1014, when the first router 802 receives a communications signal destined for CoA1, as illustrated in step 1016, the communications signal is duplicated so as to encapsulate the duplicated signals.

As illustrated in steps 1018 and 1020 the communications signal for CoA1 is encapsulated for the second router 803 so as to transmit the encapsulated signal, and the signal undergoing decapsulating at the second router 803 is transmitted via the wireless base-station 818 to the mobile terminal 814.

FIG. 11 illustrates a flowchart which continues from the sequence in FIG. 10. As illustrated in step 1102, when the communications terminal 814 enters a region E where the second, third, and fourth wireless zones overlap, the mobile terminal 814 detects the fact that it has entered a new wireless zone.

As illustrated in step 1104, the mobile terminal 814 reports to the third router 804, via a wireless link currently being used for communicating (via the wireless base-station 818), of implementing site diversity using a wireless base-station under the control of the fourth router 805.

As illustrated in steps 1106 and 1108, the third router 804 requests the fourth router 805 to obtain from the first router 802 the communications signal destined for CoA1, and the fourth router 805 responds to the request as described above.

As illustrated in steps 1110 and 1112, the fourth router 805 requests the first router 802 to transfer the communications signal destined for CoA1 based on the request from the third router 804, and the first router 802 responds to this request. Hereby, the first router 802 is to provide for a total of three communications signals for the second, third, and fourth routers 803, 804, and 805 when receiving the communications signal destined for CoA1.

As illustrated in steps 1111, 1113, and 1115, when a wireless link to the wireless base-station 819 in addition to wireless links between the mobile terminal 814 and the wireless base-stations 817 and 818 is established for the mobile terminal 814, such fact as described above is reported to the second, third, and fourth routers 803, 804, and 805.

As illustrated in step 1114, once the first router 802 receives the communications signal destined for CoA1, as illustrated in step 1016, the communications signal is duplicated so as to encapsulate the duplicated communications signals.

As illustrated in steps 1118 and 1120, the communications signal destined for CoA1 is encapsulated for the second router 803 for transferring, and after undergoing decapsulating at the second router 803 is transmitted via the wireless base-station 817 to the mobile terminal 814.

As illustrated in steps 1122 and 1124, the communications signal destined for CoA1 is encapsulated for the third router 804 for transferring, and after undergoing decapsulating at the third router 804 is transmitted via the wireless base-station 818 to the mobile terminal 814.

As illustrated in steps 1126 and 1128, the communications signal destined for CoA1 is encapsulated for the fourth router 805 for transferring, and after undergoing decapsulating at the fourth router 805 is transmitted via the wireless base-station 819 to the mobile terminal 814. Thus, site diversity using three wireless base-stations is implemented.

As illustrated in steps 1129, 1131, and 1133, when the mobile terminal 814 enters a region F where the second and fourth wireless zones overlap so that the diversity branch associated with the third wireless zone is no longer needed, the communications link with the wireless base-station 818 of the third wireless zone is cut and such fact as described above is reported to the second, third, and fourth routers 803, 804, and 805.

As illustrated in step 1130, the third router 804 reports to the first router 802 the fact that site diversity associated with the third router itself is to be terminated, and, as illustrated in step 1132, the first router 802 responds to this report. Thereafter, the number of communications signals to be duplicated in the first router 802 decreases by 1 (one). It is noted that duplicating and encapsulating of the communications signal for transferring to the second and fourth routers 803 and 805 continue to be performed.

As illustrated in step 1134, when the first router 802 receives a communications signal destined for CoA1, as illustrated in step 1136, duplicating and encapsulating of the communications signal is performed.

As illustrated in steps 1138 and 1140, the communications signal destined for CoA1 is encapsulated destined for the second router 803 for transmitting, and after undergoing decapsulating at the second router 803 is transmitted via the wireless base-station 817 to the mobile terminal 814.

Similarly, as illustrated in steps 1142 and 1144, the communications signal destined for CoA1 is encapsulated destined for the fourth router 805 for transmitting, and after undergoing decapsulating at the fourth router 805 is transmitted via the wireless base-station 819 to the mobile terminal 814.

While preferred embodiments of the present invention is described, the present invention is not limited to these embodiments so that different variations and modifications are possible within the spirit of the present invention.

What is claimed is:

1. A radio communication system wherein radio base stations including a first radio base station and a second radio base station are connected to a relaying apparatus in a non-one-to-one manner, said radio communication system comprising:
    an encapsulation unit configured to generate a first encapsulated packet by performing encapsulation on a packet addressed to a radio terminal with setting an address of the first encapsulated packet to an address of the first radio base station and generate a second encapsulated packet by performing encapsulation on the packet addressed to the radio terminal with setting an address of the second encapsulated packet to an address of the second radio base station;
    a transmitting unit configured to transmit the first encapsulated packet to the first radio base station and transmit the second encapsulated packet to the second radio base station;
    a first decapsulation unit provided in the first radio base station to perform decapsulation on the first encapsulated packet to obtain a first packet to be transmitted to the radio terminal from the first radio base station; and
    a second decapsulation unit provided in the second radio base station to perform decapsulation on the second encapsulated packet to obtain a second packet to be transmitted to the radio terminal from the second radio base station,
    wherein the first packet and the second packet have a common destination address and are transmitted to the radio terminal in parallel,
    wherein transmission to the radio terminal with respect to the packet is configured to be limited to the first radio base station and the second radio base station among the radio base stations, and
    wherein an IP address of the second radio base station and a validity period are notified by the radio terminal.

2. A radio communication method for use in a radio communication system wherein radio base stations including a first radio base station and a second radio base station are connected to a relaying apparatus in a non-one-to-one manner, said radio communication method comprising:
    generating a first encapsulated packet by performing encapsulation on a packet addressed to a radio terminal with setting an address of the first encapsulated packet to an address of the first radio base station and generating a second encapsulated packet by performing encapsulation on the packet addressed to the radio terminal with setting an address of the second encapsulated packet to an address of the second radio base station;
    transmitting the first encapsulated packet to the first radio base station and transmitting the second encapsulated packet to the second radio base station;
    performing decapsulation on the first encapsulated packet to obtain a first packet to be transmitted to the radio terminal from the first radio base station; and
    performing decapsulation on the second encapsulated packet to obtain a second packet to be transmitted to the radio terminal from the second radio base station,
    wherein the first packet and the second packet have a common destination address and are transmitted to the radio terminal in parallel,
    wherein transmission to the radio terminal with respect to the packet is configured to be limited to the first radio base station and the second radio base station among the radio base stations; and
    wherein an IP address of the second radio base station and a validity period are notified by the radio terminal.

3. A radio terminal for use in the radio communication system according to claim 1,
    said radio terminal comprising:
    a receiving unit configured to receive the first packet from the first radio base station and the second packet from the second radio base station, respectively;
    wherein transmission to the radio terminal with respect to the packet is configured to be limited to the first radio base station and the second radio base station among the radio base stations; and
    a transmitting unit configured to transmit a signal indicating the IP address of the second radio base station and the validity period to the radio communication system.

* * * * *